A. WICKE.
EGG SEPARATOR.
APPLICATION FILED DEC. 15, 1917.
1,262,420.
Patented Apr. 9, 1918.
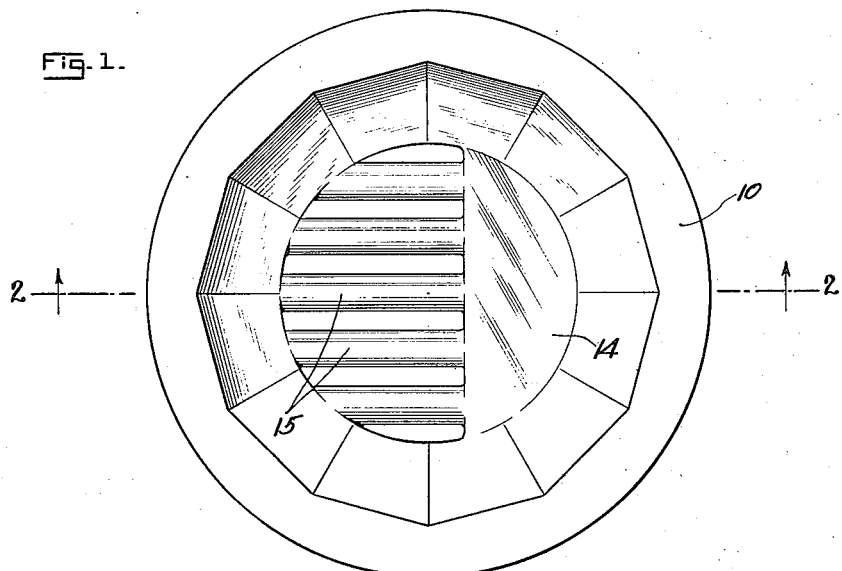
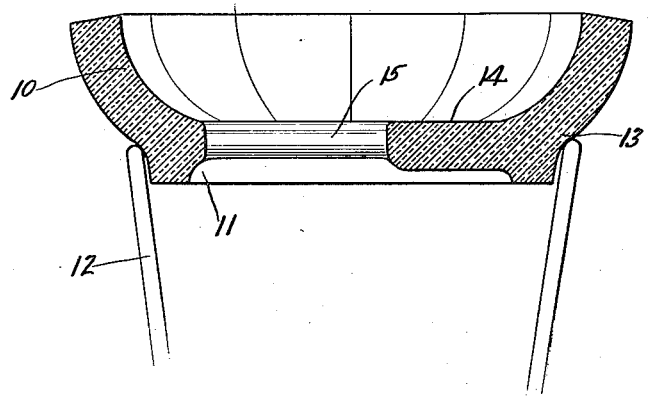
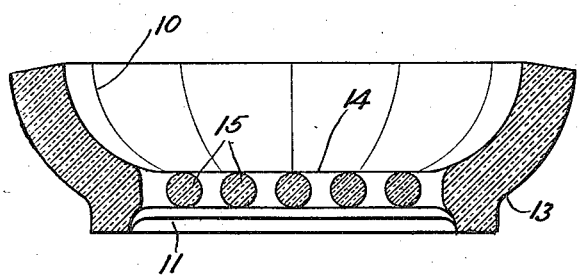
WITNESSES
INVENTOR
August Wicke
BY
ATTORNEYS

UNITED STATES PATENT OFFICE.

AUGUST WICKE, OF NEW YORK, N. Y.

EGG-SEPARATOR.

1,262,420.

Specification of Letters Patent.

Patented Apr. 9, 1918.

Application filed December 15, 1917. Serial No. 207,249.

*To all whom it may concern:*

Be it known that I, AUGUST WICKE, a citizen of the United States, and a resident of the city of New York, borough of the Bronx, in the county of Bronx and State of New York, have invented a new and Improved Egg-Separator, of which the following is a full, clear, and exact description.

This invention relates to kitchen and table articles and has particular reference to means for separating the white from the yolk of an egg.

In many instances, not only in the baking of cakes or other foods, it is frequently desirable to use either only one part of the egg or to introduce the several parts of the egg into the mixture at different times and under varying circumstances, hence it is important to provide a simple, convenient and easily cleansable device whereby such separation may be easily and thoroughly effected. The same condition obtains also in the dispensing of drinks at a soda fountain or the like where egg mixtures are made and sold that demand the separation of the white from the yolk.

Another object of the invention is to provide a device of the character indicated that is not only simple and cheap of construction but one which is thoroughly sanitary in practice.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view.

Fig. 2 is a vertical section longitudinally of the bars on the line 2—2 of Fig. 1 showing the device in position on a receiver; and Fig. 3 is a vertical transverse section.

The device is made preferably in a convenient manner as a unitary or integral structure of any suitable sanitary plastic material such as glass, porcelain or other vitreous or plastic material, although as to the particular material employed I do not propose to be limited in practice.

As indicated the device comprises an imperforate wall or flange portion 10 preferably of annular form, the same having a downwardly projecting flange or lip portion 11 adapted to project into the upper end of a tumbler or other receiver 12 against the upper edge of which the shoulder portion 13 of the rim is adapted to rest.

Within the rim 10 and in or above the horizontal plane of the lip 11 is a receiving and supporting structure comprising a shelf 14 of an imperforate nature and having an approximately flat level upper surface. This shelf portion 14 is preferably located at one side of the center of the device and in communication with one side of the rim 10. From that edge of the shelf remote from the rim 10 extend a series of bars 15 representing any suitable open mesh bottom through which the white of the egg is adapted to flow while the yolk is retained above the same or upon the shelf. While I indicate simply a series of spaced parallel bars 15 arranged preferably in the same plane as the shelf and filling the space between the shelf and the opposite side of the rim, it will be obvious that the form of this open mesh or reticulated bottom may be variously effected or constructed. The bars, however, are particularly well adapted for the purpose indicated because with the bars projecting parallel to one another toward the shelf and having smooth upper surfaces or edges, the yolk of the egg when dropped upon the shelf is adapted to roll or glide freely from the shelf to the bars or vice versa if desired for the purpose of facilitating the separation of the white from the yolk. In other words the construction indicated provides a maximum free space for the passage of the white while at the same time there are no rough or projecting parts tending to rupture the skin of the yolk even though the yolk may be caused to glide repeatedly to and fro along the bars. It is well known that eggs, even though perfectly fresh laid, when warm have a different consistency from eggs, especially fresh eggs, that are cool. When the egg is broken and delivered from the shell upon the shelf the operator can tell immediately whether it is necessary or not for the yolk to be moved from the shelf upon or along the bars in order to effect complete separation of the white therefrom. If the egg is cool and stiff such action is usually necessary. If, however, the consistency of the egg is thin the yolk may be retained upon the shelf while the white will flow automatically therefrom between the bars into the receptacle 12. In any event the white which passes through the bars will be guided by the lip 11 into the receptacle and the yolk will be retained at the indicated place within the separator, preferably upon the shelf.

I claim:

The herein described egg separator comprising an imperforate rim structure, a yolk receiving shelf secured within the rim at one side thereof, and a series of spaced parallel bars extending from the shelf to the opposite side of the rim, the tops of the bars lying in the same plane as the top of the shelf.

AUGUST WICKE.

Witnesses:
ELLA WICKE,
ERNST. HILBERT.